Aug. 28, 1951  J. W. FRENCH ET AL  2,565,807
ANTIVIBRATION SUPPORTING ARRANGEMENT FOR OPTICAL
INSTRUMENTS OF THE TELESCOPE TYPE
Filed July 10, 1946  2 Sheets-Sheet 1
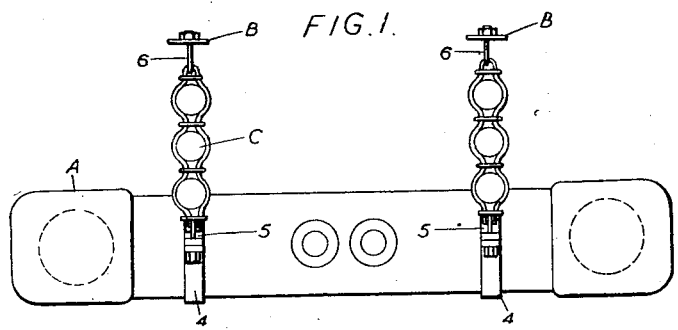
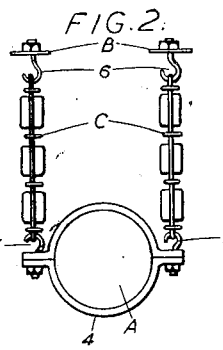
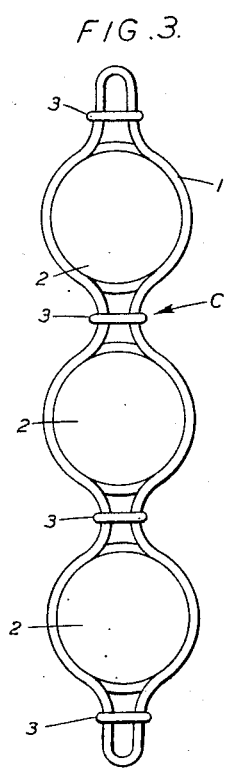
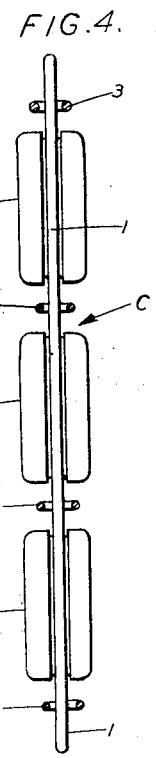
Inventors
James W. French
John M. Strang
Charles D. MacGill
By Lancaster, Allwine & Rommel
Attorneys

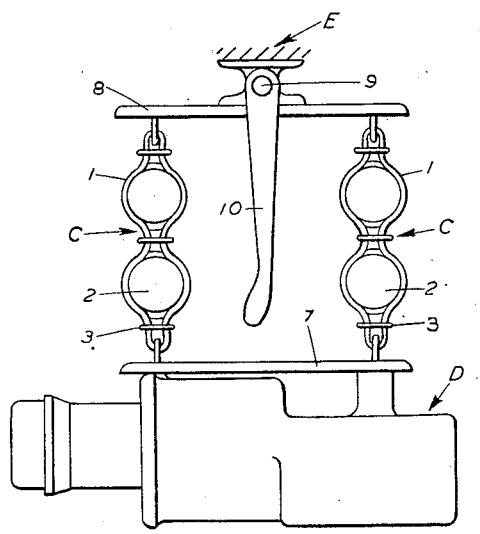
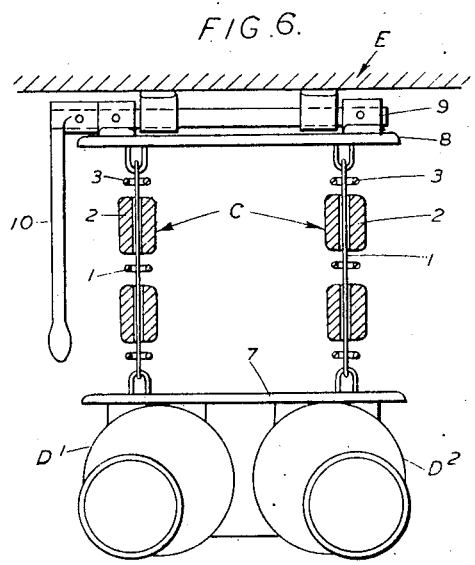

Patented Aug. 28, 1951

2,565,807

UNITED STATES PATENT OFFICE 2,565,807

ANTIVIBRATION SUPPORTING ARRANGEMENT FOR OPTICAL INSTRUMENTS OF THE TELESCOPE TYPE

James Weir French, John Martin Strang, and Charles D. Macgill, Glasgow, Scotland, assignors to Barr & Stroud, Limited, Glasgow, Scotland Application July 10, 1946, Serial No. 682,454
In Great Britain December 4, 1939

Section 1, Public Law 690, August 8, 1946
Patent expires December 4, 1959

3 Claims. (Cl. 88—36)

This invention refers to anti-vibration supporting arrangements for optical instruments of the telescope type, such as rangefinders, heightfinders, inclinometers, spotting glasses, binocular and monocular telescopes, the invention being particularly intended for the support of instruments on board ship.

According to this invention, an anti-vibration supporting arrangement is provided comprising a number of spaced suspension members each made up of a flexible relatively inelastic element and a resilient element (or elements) composed, for example, of rubber, so combined that, under longitudinal tension due to the weight of the instrument, the inelastic element acts compressively in the transverse direction on the resilient element (or elements) which, by its resilience absorbs vibration, and the supporting arrangement also comprises provision for angular movement of the instrument, relative to the structure from which it is supported, about a horizontal or approximately horizontal axis at right angles to the direction of sight to enable the inclination of the line of sight of the instrument to be varied as it hangs in the supporting arrangement.

In one construction, the arrangement is such that the instrument can move angularly relative to the suspension members to vary the inclination of the line of sight, the suspension members themselves not requiring to move in this operation, while in another construction, the suspension members are themselves relatively movable up and down without extension to effect angular movement of the instrument.

In practice, the inelastic element of a suspension member may comprise two lengths of wire, cord or the like hanging side by side with one or more than one resilient element, for example blocks of rubber, between them keeping the two lengths of inelastic element, which are held together above and below each resilient element, at a distance apart.

In the case of an instrument such as a rangefinder having a tubular base casing extending transversely to the direction of sight, the attachment of the suspension members to the instrument may be effected through the medium of parts which provide bearings in which the tubular base casing can turn about its own axis.

In other cases each of the suspension members may extend downwards from a carrier which is capable of being inclined so as to incline the instrument.

The invention will now be described by way of example with reference to the accompanying drawings, in which:

Figure 1 is a side view and Figure 2 an end view showing the suspension of a stereoscopic instrument with a transversely extending base casing.

Figures 3 and 4 show one of the suspension members on a larger scale, while

Figures 5 and 6 are a side view and an end view, respectively, showing the suspension of a prismatic binocular instrument.

Figures 1, 2, 3 and 4 show a stereoscopic telescope instrument A, brackets B from which the instrument A is suspended, and suspension members C, of which there are four.

Each of the suspension members C is made up of a piece of wire 1, a number of cylindrical rubber blocks 2, and a number of metal rings 3.

The wire 1 is formed into a closed loop and the loop is elongated so as to give two lengths of wire lying side by side. Rings 3 are slipped on to the elongated loop and are spaced apart on it. Blocks 2 are inserted between the two lengths, one between each pair of adjacent rings 3, so as to hold the blocks in place as shown in Figures 3 and 4. The blocks are grooved peripherally to receive the wire. Any length of suspension member may be built up in this way, but for the support of an instrument such as in the present example the member is preferably short. Assuming the instrument to be suspended on board ship liable to rolling and pitching movement, the length of the suspension members may be such that for a 15° inclination of the supporting structure B the movement of the instrument from its normal position will not exceed 1 inch.

The instrument A has two collars 4 fitted around its casing and is capable of turning in the collars about the axis of the casing, the collars being made in halves for assembly. Each collar has two hooks 5, one at the front and one at the rear of the instrument, and two corresponding hooks 6 are provided on each of the brackets. Each suspension member C is hooked at the top to a bracket B and at its lower end is hooked to the instrument, the bracket hook 6 being vertically above the corresponding collar hook 5. Under the weight of the instrument, the lengths of wire press against the sides of the rubber blocks which tend to flatten under this pressure. Their deformation is, however, small. The resilience of the blocks 2 absorbs vibration from the brackets B. As the wire tends to straighten, the component of the tension acting compressively on the blocks diminishes.

Swinging motion of the instrument relative to the brackets, either transversely or backwards and forwards, produces no tilting of the instrument as the plane of the hooks 5 is and remains parallel with the plane of the hooks 6.

In Figures 5 and 6 the instrument D comprises two limbs D1 and D2 carried on a plate 7 and movable relatively to one another in the transverse direction for interocular adjustment. The plate 7 is suspended by four suspension members C, as previously described, from a carrier 8, which is capable of angular movement relative to the supporting structure E about a transverse axis 9. In this case when the carrier is inclined the front pair of suspension members C move up and down relatively to the rear pair and the instrument is thereby inclined. Inclination of the carrier 8 in the example illustrated is effected by means of a hand lever 10. In some cases, inclination of the carrier may be effected and controlled independently of the observer.

We claim:

1. An anti-vibration mounting for an instrument of the telescope type, said mounting comprising two dependent side-by-side lengths of inelastic, flexible material for suspending the instrument and at least one resilient element gripped between said lengths and flexing the latter away from each other in opposite transverse directions, whereby, when the instrument is suspended by the lengths, the latter tend to straighten under the longitudinal tension due to the weight of the instrument and act compressively in said transverse directions on said resilient element, which, by its resilience absorbs vibration.

2. An anti-vibration suspension device for an instrument of the telescope type, said device comprising a dependent member for connection at its upper end to a fixed support and for connection at its lower end to the instrument, said member consisting of two side-by-side lengths of inelastic, flexible material and at least one resilient element located between and held by said lengths intermediate their upper and lower ends and flexing said lengths away from each other in opposite directions, whereby, when the instrument is suspended by the device, the lengths tend to straighten under the longitudinal tension due to the weight of the instrument and act compressively on said resilient element, which, by its resilience absorbs vibration.

3. An anti-vibration mounting for an instrument of the telescope type, said mounting comprising a dependent member for connection at its upper end to a fixed support and for connection at its lower end to the instrument to suspend the latter, said member consisting of a closed loop of inelastic, flexible material elongated to form two side-by-side lengths, a plurality of resilient circular blocks located between and maintaining said lengths apart and spaced one above the other, and a plurality of tie rings, each freely encircling the lengths intermediate two adjacent blocks and drawing the lengths around the blocks towards each other above and below each block, whereby, when the instrument is suspended, the inelastic flexible lengths tend to straighten due to the weight of the instrument and act compressively in the transverse direction on said resilient elements, which, by their resilience absorb vibration.

JAMES WEIR FRENCH.
JOHN MARTIN STRANG.
CHARLES D. MACGILL.

REFERENCES CITED

The following references are of record in the file of this patent:

UNITED STATES PATENTS

| Number | Name | Date |
|---|---|---|
| 374,478 | Jenkins | Dec. 6, 1887 |
| 1,315,225 | Hughes | Sept. 9, 1919 |
| 1,756,413 | Wilkie et al. | Apr. 29, 1930 |
| 2,353,952 | Yerzley | July 18, 1944 |
| 2,389,562 | Storch | Nov. 20, 1945 |

FOREIGN PATENTS

| Number | Country | Date |
|---|---|---|
| 577,069 | Great Britain | May 3, 1946 |